US009929582B2

(12) United States Patent
Matsumura et al.

(10) Patent No.: US 9,929,582 B2
(45) Date of Patent: Mar. 27, 2018

(54) ADAPTIVE CHARGE CURRENT FOR A BATTERY

(71) Applicant: Intel Corporation, Santa Clara, CA (US)

(72) Inventors: Naoki Matsumura, San Jose, CA (US); Allen Huang, Beaverton, OR (US); Jim Xu, Beaverton, OR (US); Mike Ngo, Beaverton, OR (US); Vivek Ramani, Hillsboro, OR (US); Darren Crews, Hillsboro, OR (US); Gang Ji, Santa Clara, CA (US); Alexander Uan-zo-li, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 176 days.

(21) Appl. No.: 14/581,703

(22) Filed: Dec. 23, 2014

(65) Prior Publication Data

US 2016/0181830 A1   Jun. 23, 2016

(51) Int. Cl.
*H02J 7/00* (2006.01)
*G06F 1/26* (2006.01)

(52) U.S. Cl.
CPC .............. *H02J 7/007* (2013.01); *G06F 1/263* (2013.01); *H02J 7/0052* (2013.01)

(58) Field of Classification Search
CPC ........ H02J 7/0052; H02J 7/007; H02J 7/0003; H02J 7/0013; H02J 7/0021; H02J 7/0047; H02J 7/0068; H02J 7/025; H02J 7/0073; H02J 7/045; G06F 1/263; G06F 1/26
See application file for complete search history.

(56) References Cited

U.S. PATENT DOCUMENTS

| 7,751,994 | B2 | 7/2010 | Matsumura et al. |
| 8,612,782 | B2 | 12/2013 | Vilhauer et al. |
| 8,638,072 | B2 | 1/2014 | Vilhauer et al. |
| 9,411,398 | B2 | 8/2016 | Ji et al. |

(Continued)

OTHER PUBLICATIONS

"Smart Battery Charger Specification Rev. 1.1", *SBS Implementers Forum*, Dec. 11, 1998, 39 pages.

(Continued)

*Primary Examiner* — Drew A Dunn
*Assistant Examiner* — Sailesh Thapa
(74) *Attorney, Agent, or Firm* — Womble Bond Dickinson (US) LLP

(57) ABSTRACT

A method and apparatus for adjusting the charge for a battery under a power sharing arrangement is disclosed. In one embodiment, the method comprises determining if power output capacity of an alternating current (AC) adapter is less than or greater than a system power requirement for a system that receives power from the AC adapter and a battery, determining a charge current for charging the battery from the AC adapter, based on a voltage range of the battery, the current charge being less than excess current available from the AC adapter in view of determining that the power output capacity of the AC adapter is greater than the system power requirement, and controlling a battery charger to charge the battery with the charge current by specifying the charge current to the battery charger if the power output capacity of the AC adapter is greater than the system power requirement.

25 Claims, 6 Drawing Sheets

(56) References Cited

U.S. PATENT DOCUMENTS

| | | | |
|---|---|---|---|
| 9,612,643 B2 | 4/2017 | Uan-Zo-Li et al. | |
| 2008/0122290 A1* | 5/2008 | Li | G06F 1/263 307/31 |
| 2008/0238361 A1* | 10/2008 | Pinnell | H02J 7/045 320/107 |
| 2009/0243549 A1 | 10/2009 | Matsumura et al. | |
| 2011/0057621 A1* | 3/2011 | Hong | H02J 7/0073 320/134 |
| 2012/0268063 A1* | 10/2012 | Qiu | H02J 7/045 320/107 |
| 2015/0380953 A1 | 12/2015 | Keates et al. | |
| 2016/0049803 A1* | 2/2016 | Hsu | H02J 7/045 320/162 |

OTHER PUBLICATIONS

"Smart Battery Data Specification Rev. 1.1", *SBS Implementers Forum*, Dec. 11, 1998, 54 pages.

\* cited by examiner

ADAPTIVE CHARGE CURRENT FOR A BATTERY

FIELD OF THE INVENTION

Embodiment of the present invention relate to the field of battery charging; more particularly, embodiments of the present invention relate to adapting the charge current used to charge a battery based on a battery voltage range.

BACKGROUND OF THE INVENTION

Mobile devices such as portable computers, tablets, and smart phones can often be powered by a battery or an alternating current (AC) adapter. Preferably, if an AC adapter is plugged into a mobile device, the mobile device uses power from the AC adapter rather than the battery. If an AC adapter is not plugged into the mobile device, the mobile device uses power from the battery.

Today, the system power requirements of a mobile device may be such that more power is needed by the mobile device than the AC adapter can provide (even though it is a constant source of power when plugged into the mobile device). In some systems, when both the battery and the AC adapter are available, in order to provide the necessary power to the mobile device to meet its system power requirements, the mobile device receives power from both the AC adapter and the battery, where the battery power is supplementing the power provided by the AC adapter. This is referred to as power sharing.

However, in systems that use power sharing, there are times when the power output capacity of the AC adapter is greater than the system power requirement of the mobile device. In this case, the excess power capacity is used for charging of the battery.

A problem exists when using power sharing. Because the system power requirements of the mobile device are constantly changing, this power sharing causes repeated charging and discharging (e.g., sporadic charge/discharge) of the battery. The repeated charging and discharging impacts battery cycle life. Furthermore, repeating the charging and discharging of the battery in higher voltage ranges degrades the battery cycle life more than that in lower voltage ranges. That is, sporadic charging and discharging degrades battery cycle life especially when it occurs in a higher voltage range. Thus, while the use of power sharing has advantages, it can produce undesirable consequences.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Figure 1:
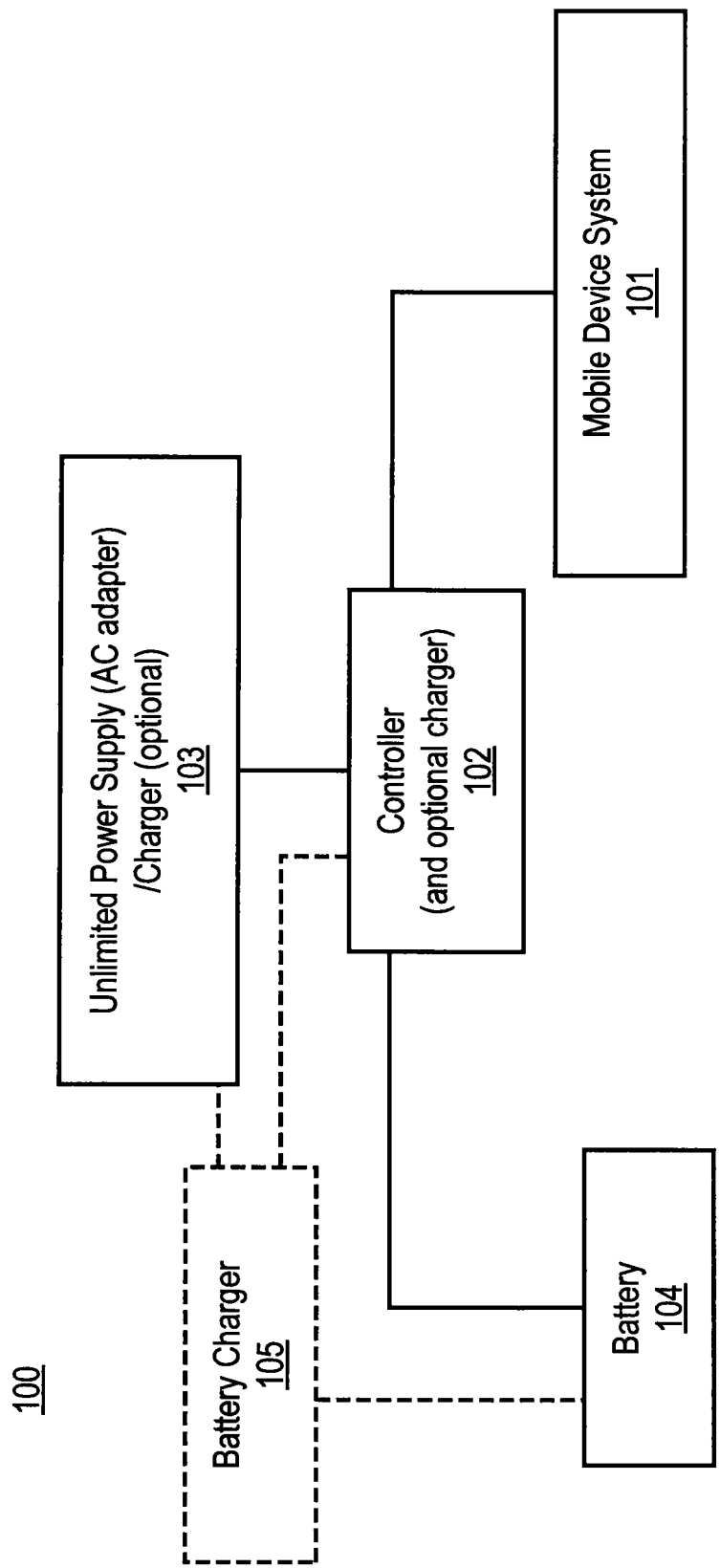
FIG. 1 is a block diagram of one embodiment of a system environment.

FIG. 1 is a block diagram of one embodiment of a system environment. Referring to FIG. 1, system environment 100 includes a mobile device (system) 101 (e.g., a tablet, a smart phone, a portable computer, a personal digital assistant (PDA), etc.). System environment 100 also includes an unlimited power supply 103 and a rechargeable battery 104 to provide power to mobile device 101. Note that the unlimited nature of power supply 103 refers to it being a constant source of power as opposed to a power supply that could provide all the power needed by the devices in system environment 100, such as mobile device 101, to which is provides power. In one embodiment, unlimited power supply 103 comprises an alternating current (AC) adapter.

In one embodiment, unlimited power supply 103 and battery 104 are coupled to mobile device system 101 directly. In another embodiment, unlimited power supply 103 and battery 104 are coupled to mobile device 101 through controller 102. In one embodiment, battery 104 is a rechargeable battery cell. In another embodiment, battery 104 is a rechargeable battery pack. In one embodiment, battery 104 is a Li-ion rechargeable battery.

When unlimited power supply 103 is coupled to mobile device 101, mobile device 101 uses power preferably from unlimited power supply 103. For example, when unlimited power supply 103 is an AC adapter and the AC adapter is plugged into mobile device 101, mobile device 101 uses power from the AC adapter preferentially, rather than battery 104. If unlimited power supply 103 is not coupled to mobile device 101, mobile device 101 uses power from battery 104.

If power output capacity of unlimited power supply 103 is smaller than the system power requirement (e.g., the peak power) of mobile device 101, then mobile device 101 receives power from both unlimited power supply 103 and battery 104, where battery 104 provides supplemental power. When power output capacity of unlimited power supply 103 is greater than the system power requirement, then the excess power capacity of power supply 103 that is not used to provide power to mobile device 101 budget of AC adapter is used for charging of battery 104. In these cases, system environment 100 includes "power sharing".

In one embodiment, system environment 100 includes a battery charger 105 as a separate device. In this case, in one embodiment, unlimited power supply 103 provides power to battery charger 105. In another embodiment, battery charger 105 is part of power supply 102. In yet another embodiment, battery charger 105 is part of controller 102.

In one embodiment, controller 102 controls the battery charging operation in system environment 100. In one embodiment, this control is performed during power sharing in such a way as to avoid the repeated charge and discharge (sporadic charge/discharge) of battery 104, which impacts battery cycle life. In one embodiment, controller 102 controls the battery charging based on the voltage range of battery 104. More specifically, controller 102 controls battery charging such that battery 104 is charged using a normal charge current while battery 104 is in a first, lower voltage range and controls the battery charging to avoid repeating the charging and discharging while battery 104 is in a second, higher voltage range, which degrades battery cycle life more than if that occurs in the lower voltage range.

In one embodiment, controller 102 controls battery charging by adjusting the charge current depending on which battery voltage range battery 104 is in. In one embodiment, to determine whether the battery is in a particular battery voltage range, the battery Open Circuit Voltage (OCV) is used. In one embodiment, this is determined by OCV hardware. Alternatively, the battery OCV is estimated. When battery OCV is in a higher voltage range and under power sharing, controller 102 reduces the charge current to less than the normal charge current that would be used. This extends the battery cycle life. When battery OCV is in lower voltage range, controller 102 keeps controls battery charging such that the normal charge current from power supply 103 is used to charge battery 104 as impact on battery cycle life while the battery is in the lower voltage range is small.

In one embodiment, the battery charging process includes the following operations. First, a determination is made as to whether the power output capacity of an unlimited power supply, such as an AC adapter, is smaller than system power requirement. In one embodiment, a determination as to the system power requirement is made by mobile device 101. In an alternative embodiment, controller 102 or another device performs in-line detection of the power being sent to and used by mobile device 101 in order to make a determination as to the system power requirements.

Second, after determining whether the power output capacity of an unlimited power supply is smaller than system power requirement, the controller responsible for controlling the charging of the battery enters an "extend cycle life" mode to control the battery charging process.

Third, after entering the "extend cycle life" mode, the controller estimates the battery OCV by reading battery voltage and current and determines which voltage range the battery is in. In one embodiment, the controller estimates the battery OCV by reading the battery voltage when the battery is relaxed (not under high load). In this case, the voltage is close to the OCV. In another embodiment, the controller estimates the battery OCV by reading the battery voltage (V), reading the battery current (I), estimating the battery impedance (R) (where an IC in a battery has the capability to estimate impedance), and then calculating the OCV according to the following:

$$OCV=V+IR$$

Fourth, after determining the voltage range, the controller determines the charge current (e.g., an amount of charge from the unlimited power supply) that is used to charge the battery based on that voltage range. Based on the information from the controller, the battery charger (e.g., a battery charger IC) reduces the charge current.

Note that the current charge is reduced from the amount that could be used to charge the battery from the unlimited power supply. That is, if the battery is typically charged with a certain charge current (e.g., its normal charge current), the charge current is reduced from the amount to a lower amount based on the voltage range the battery is in. In this case, the battery charging is not using all of the excess power available from the unlimited power supply (because it is not needed for the system power requirements at that time) to provide charge current for the battery.

Figure 2:
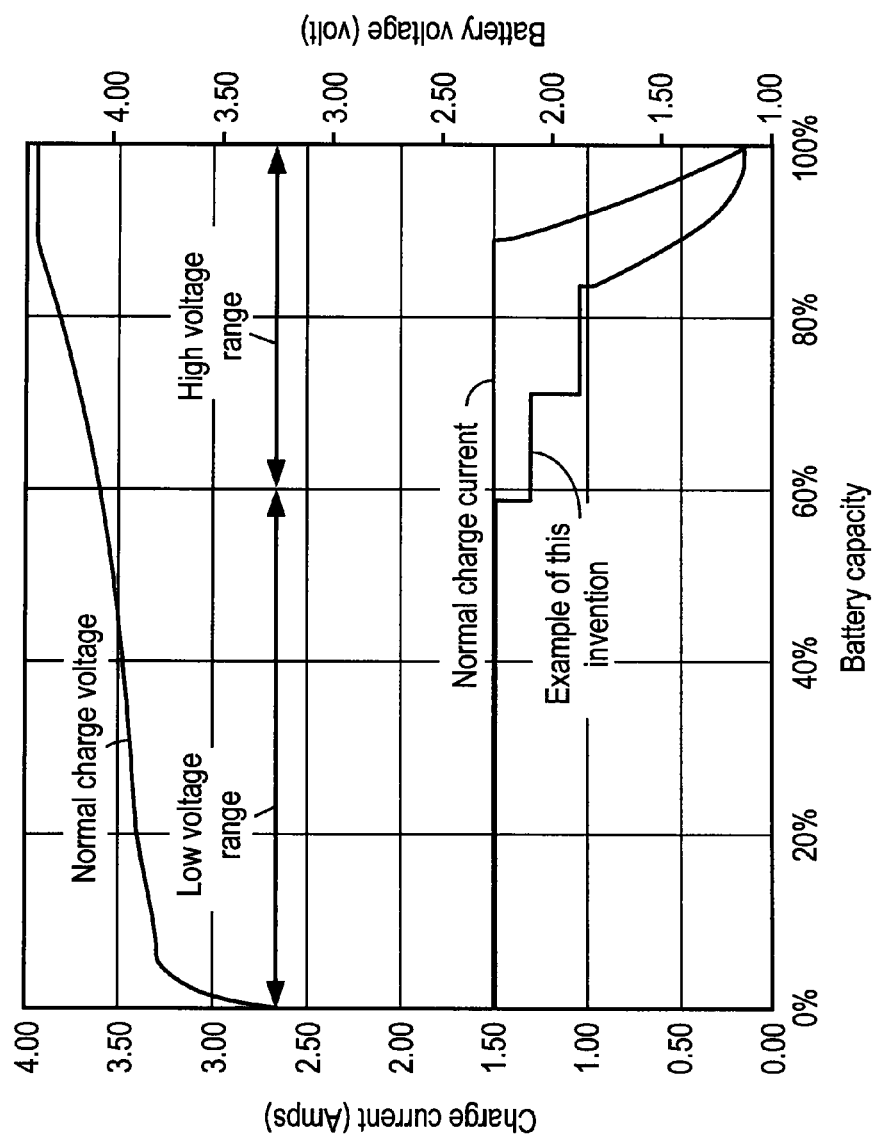
FIG. 2 illustrates one embodiment of a charge current graph.

In one embodiment, the reduction in current charge follows a stair step pattern. FIG. 2 illustrates one embodiment of a charge current graph. Referring to FIG. 2, a low voltage range 201 and a high voltage range 202 are shown. During low voltage range 201, a normal charge current is used to charge the battery. The normal charge current is specific to the battery and is the charge current that would be used to charge the battery in normal circumstances if an unlimited amount of charge current were available. In one embodiment, the charge current is 1.50 A for a 3 Ah Li-ion battery. During high voltage range 202, the charge current changes in a downward stair step fashion. When the battery is in the high voltage range and has a capacity between 50% and 70%, one particular charge current is used (e.g., 1.3 A in FIG. 2), and when the battery is in the high voltage range and has or reaches a capacity between 70% and 85%, another charge current is used (e.g., 1.05 A in FIG. 2). Once the battery capacity reaches 85% capacity, the charging current is gradually decreased in a curved fashion as shown. Thus, the charge current is changed while charging the battery based on the battery capacity.

In one embodiment, low voltage range 201 is from 0 to 50% battery capacity, while high voltage range 202 is from above 50% battery capacity. However, this is not required and the two voltages ranges do not have to be the same size. For example, low voltage range 201 can be from 0 to 60% battery capacity, while high voltage range 202 is above 60% battery capacity. Furthermore, the number of steps that are used can be more or less than the two shown in FIG. 2.

Figure 3:
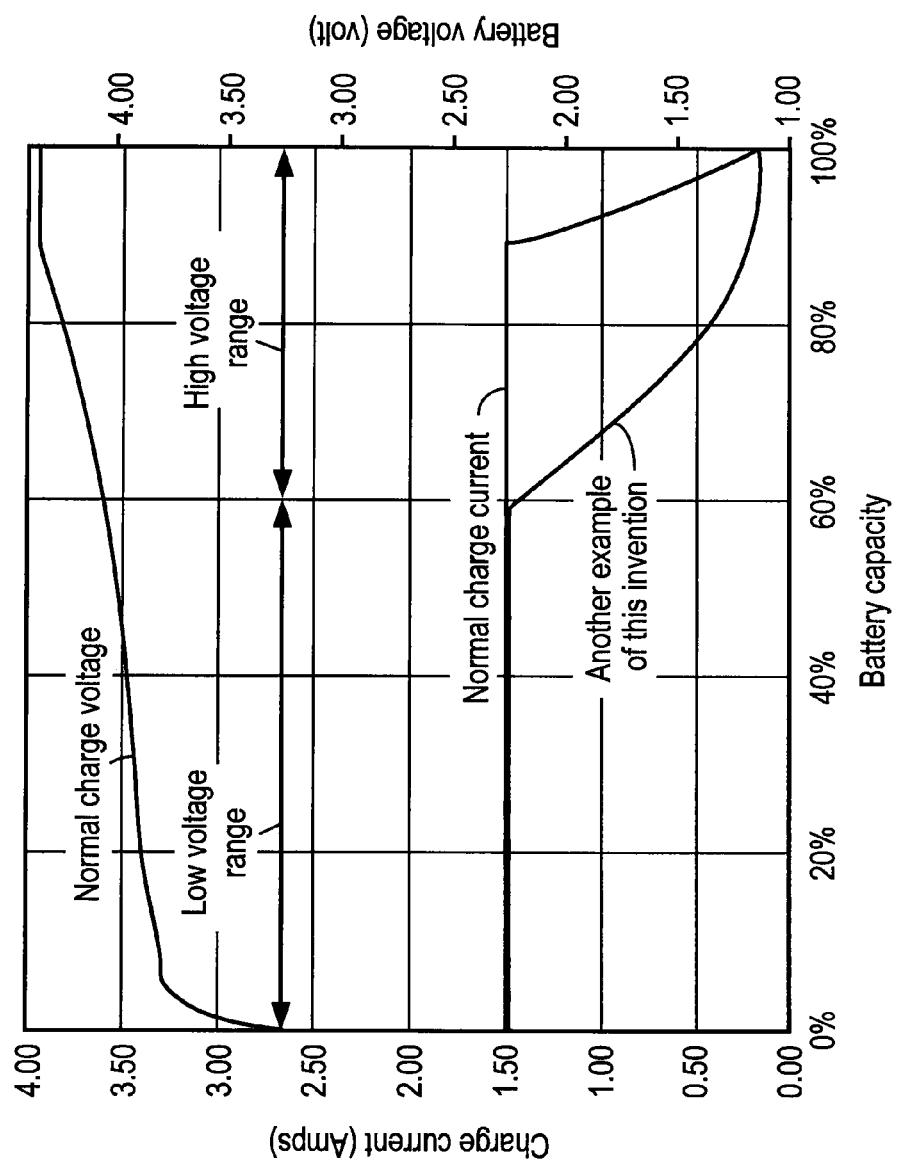
FIG. 3 illustrates another embodiment of a charge current graph.

In one embodiment, the adjustment to the charge current can take forms other than the downward stair step shown in FIG. 2. For example, in one embodiment, the charge current is adjusted downward gradually when in the high voltage range. In another embodiment, the charge current is adjusted downward linearly when in the high voltage range. FIG. 3 illustrates an alternative embodiment of a current charge graph. In yet another embodiment, a combination of these different charge current adjustments could be used for charging one battery.

Note also that the currents and voltages used throughout are merely examples and would depend on the batteries being used and charged.

In another embodiment, the controller controls the battery charging current based on a maximum charge current determination. This control technique includes the following operations. First, the controller that controls the battery charging process determines if the power output capacity of the unlimited power supply (e.g., an AC adapter) is smaller or greater than the system power requirement. If so, the controller determines the maximum charge current (MaxChargeCurrent), which is the maximum charge current that the battery can accept. In one embodiment, the maximum charge current is determined in a manner well-known in the art based on at least one of the battery temperature, the battery voltage, the battery age (in charging cycles), the battery impedance, and battery state of charge. After determining the maximum charge current, the controller controls the battery charging process so that the battery is charged using the maximum charge current if the power output capacity of the unlimited power supply is greater than the system power requirements. Note that this technique is beneficial because reducing the current leads to extending the cycle life. Furthermore, this technique may lead to situations where fast charging may be used if determining the maximum charge current results in use of an increased charge current to charge the battery.

Figure 4:
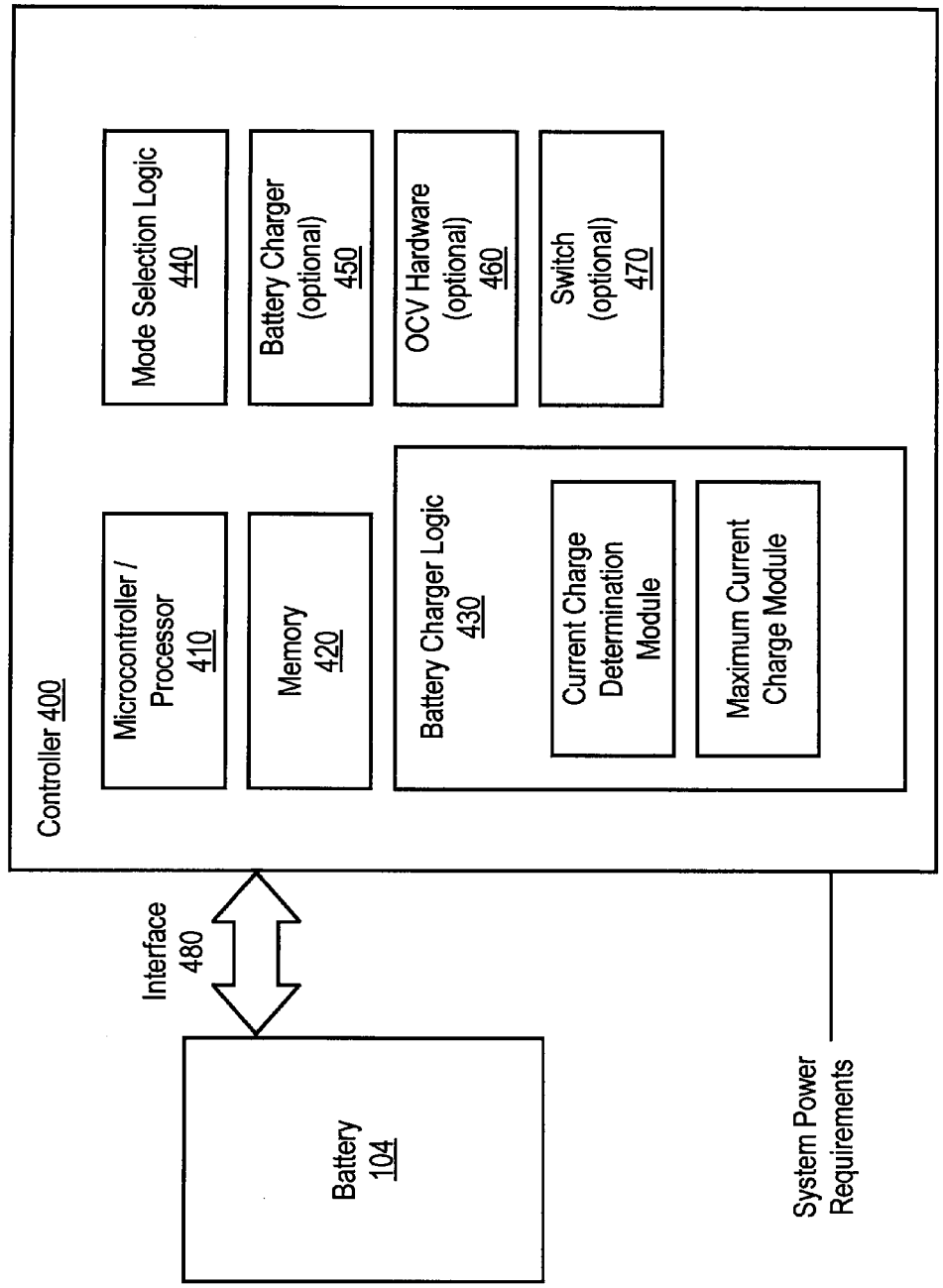
FIG. 4 is a block diagram of one embodiment of a battery charging controller.

FIG. 4 is a block diagram of one embodiment of a controller. In one embodiment, the controller is an application specific integrated circuit (ASIC), a digital signal processor (DSP), a field programmable gate array (FPGA), a processor, etc., including the functional blocks depicted in FIG. 4. Alternatively, all or part of controller 400 is implemented as software stored on a memory (e.g., memory 420) and executed by, for example, a processor. In one embodiment, the controller (e.g., a control IC) is part of power management integrated circuit (PMIC). In another embodiment, the controller is part of a fuel gauge. In yet another embodiment, the controller is part of a battery management system.

Referring to FIG. 4, controller 400 interfaces with battery 104 using interface 480. Interface 480 includes a physical interface for supplying power and ground. In one embodiment, controller 400 includes a fuel gauge and interface 480 only provides power and ground. In one embodiment, interface 480 also includes a data interface (e.g., a data line) and a clock. In one embodiment, battery 104 includes a fuel gauge and used the data interface and the clock to transfer information, such as, for example, battery impedance and battery age, to controller 400.

In one embodiment, controller 400 includes at least a processor or microcontroller 410, a memory 420, a battery charging logic 430. In one embodiment, battery charging logic determines a charge current for charging the battery from an unlimited power supply (e.g., an AC adapter) based on a voltage range of the battery. In one embodiment, battery charging logic 430 sets the charge current for charging the battery to be less than the excess current available from the unlimited power supply and is set in response to a determination that the power output capacity of the AC adapter is less than the system power requirement. In one embodiment, this determination is made by mode selection logic 440. Battery charging logic 430 also controls a battery charger, such as battery charger 450 to charge the battery with the charge current by specifying the charge current to the battery charger. In response, the battery charger reduces the current used for charging the battery to a level equal to the charge current.

In one embodiment, battery charging logic 430 of controller 400 determines the charge current based on whether the voltage of the battery is in a first voltage range or a second voltage range and sets the charge current to a first amount when the battery is in the first voltage range and adjusts the charge current to different predetermined amounts of current when the voltage of the battery is in the second voltage range. In one embodiment, the different predetermined amounts of current are selected based on a stair stepped reduction in the charge current, a linear reduction in the charge current, or a downward curved reduction in the charge current.

In one embodiment, battery charging logic 430 of controller 400 determines whether the battery voltage is in a range using an estimate of the battery voltage. This occurs by estimating open circuit voltage (OCV) of the battery. In another embodiment, controller 400 includes OCV hardware 460 to determine the OCV.

In one embodiment, battery charging logic 430 of controller 400 determines the charge current for charging the battery by determining a maximum charge current that the battery can accept and setting the charge current to the maximum charge current. The controller determines the maximum charge current based on one or more of temperature of the battery, voltage of the battery, age of the battery, and battery impedance.

While not shown in FIG. 4, in one embodiment, controller 400 includes analog-to-digital converters (ADCs), filters, and a digital amplifier. One or more of the ADC, the filters, and the digital amplifier may be, for example, an ASIC, a DSP, an FPGA, a processor, etc. These elements may be used convert an analog measurement (e.g., battery current and voltage) to a digital value for use in the battery charging control process. For example, the digital amplifier may be a differential amplifier that generates an analog signal based on the voltage drop across the battery (e.g., the difference in voltage values between the positive and negative terminal), which is then converted to a filtered digital value using the ADC and the filter.

Controller 400 includes mode selection logic 440 that determines when to enter the extend cycle life mode. When such a determination is made, mode selection logic 440 sends a notification or otherwise signals battery charging logic 430. In response, battery charging logic 430 controls the charging process as described above.

In one embodiment, the extend cycle life mode may be selectable by a user, such as a user of the mobile device. The user of the mobile device could display a user interface that allows the user to select (e.g., via drop down menu, check box, touching or depressing a location of the display screen, etc.) to enter the mode. In response, the mobile device using a combination of hardware and software would send a notification to mode selection logic 490, which in turn would signal controller battery charging logic 430 responsible for controlling the battery charging process to cause the controller to enter the extend cycle life mode.

In one embodiment, mode selection logic 440 of controller 400 triggers entry into the extend cycle life mode when the battery capacity of the battery (e.g., battery 104 of FIG. 1) is greater than a predetermined percentage (e.g., 50%, etc.).

In other embodiments, mode selection logic 440 triggers entry into the extend cycle life mode based on a characteristic of the battery. For example, in one embodiment, mode selection logic 440 triggers entry into the extend cycle life mode based on the specific charge cycle number of the battery. In another embodiment, mode selection logic 440 triggers entry into the extend cycle life mode based a change of battery degradation speed.

In one embodiment, controller 400 includes a switch 470 to connect or disconnect the unlimited power supply (e.g., power supply 103 of FIG. 1) to the battery (e.g., battery 10) to charge the battery 105. Note that in alternative embodiments, switch 470 is not part of controller 400.

In one embodiment, controller 400 includes a battery charger 450 to charge the battery using current charge from the unlimited power supply.

Figure 5:
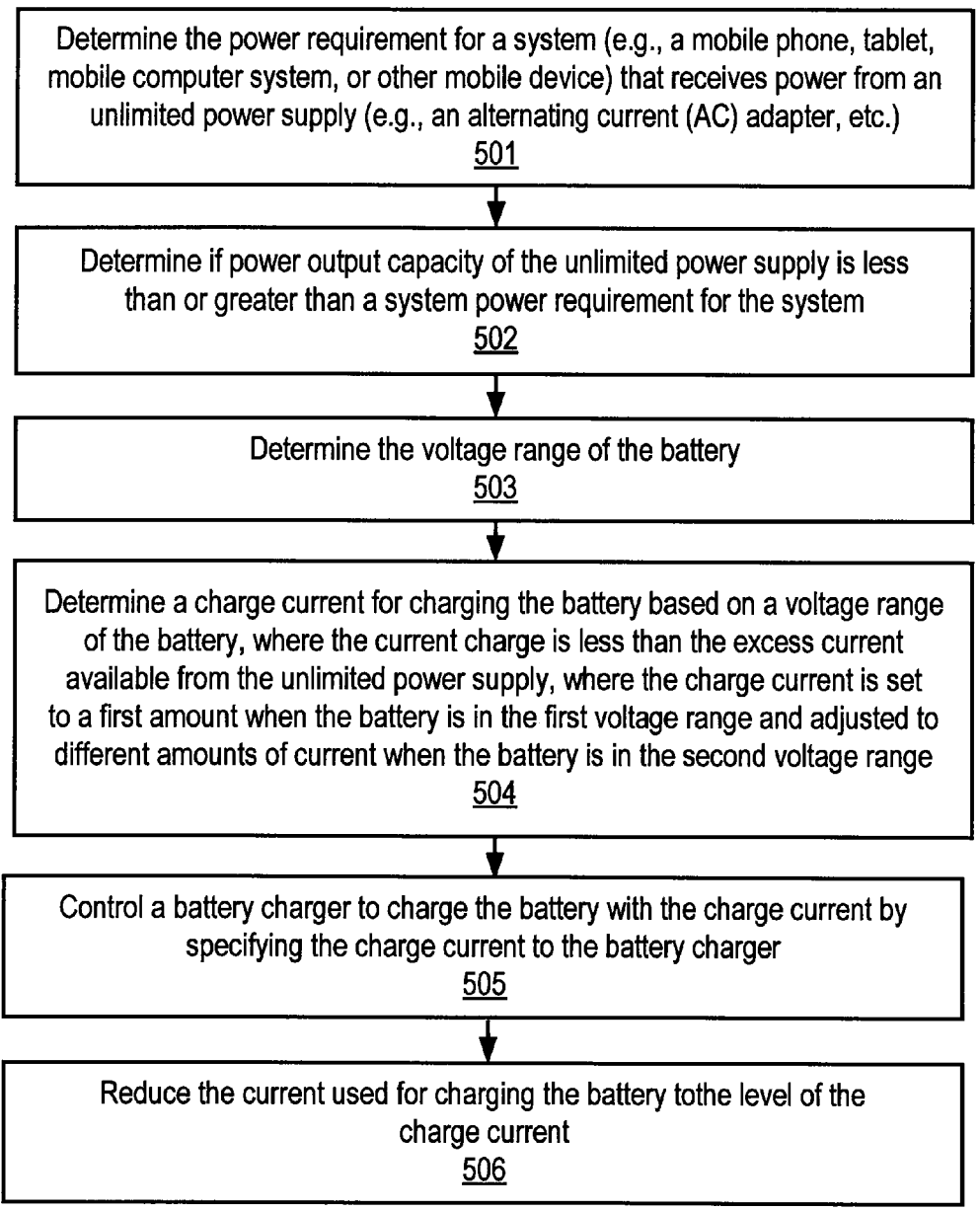
FIG. 5 is a flow diagram of one embodiment of a process for controlling the charging of a battery.

FIG. 5 is a flow diagram of one embodiment of a process for controlling the charging of a battery. The process is performed by processing logic that may comprise hardware (circuitry, dedicated logic, etc.), software (such as is run on a general purpose computer system or a dedicated machine), firmware, or a combination of these three.

Referring to FIG. 5, the process begins by processing logic determining the power requirement for a system (e.g., a mobile phone, tablet, mobile computer system, or other mobile device) that receives power from an unlimited power supply (e.g., an alternating current (AC) adapter, etc.) (processing block 501). In one embodiment, this is performed by the system itself and the results of the determination are sent to a battery charging controller. In another embodiment, the determination is made by performing in-line monitoring of the power being received by the system from the unlimited power supply.

Using the system power requirement, processing logic determines if power output capacity of the unlimited power supply is less than or greater than a system power requirement for the system (processing block 502).

Also, processing logic determines the voltage range of the battery (processing block 503). In one embodiment, determining the voltage range of the battery comprises estimating the open circuit voltage (OCV) of the battery.

If processing logic determines that the power output capacity of the unlimited power supply is greater than the system power requirement, processing logic determines a charge current for charging the battery from the unlimited power supply, based on a voltage range of the battery, where the current charge is less than excess current available from the unlimited power supply (processing block 504). In other words, while the charge current for the battery could be set higher based on the available power from the unlimited power supply, the charge current is set lower. As discussed above, in one embodiment, this is done to extend the battery cycle life because reduced current mitigates battery degradation, as is well-known in the art.

In one embodiment, processing logic determines the charge current for charging the battery based on whether the battery is in a first voltage range or a second voltage range. In one embodiment, the charge current is set to a first amount when the battery is in the first voltage range and adjusted to different amounts of current when the battery is in the second voltage range. In various embodiment, the different amounts follow a stair stepped reduction in the charge current, a linear reduction in the charge current; or a downward curved reduction in the charge current.

Once the charge current is set, processing logic controls a battery charger to charge the battery with the charge current by specifying the charge current to the battery charger (processing block 505).

In one embodiment, in response to the charge current being set, processing logic in the battery charger reduces the current used for charging the battery to the level of the charge current (processing block 506).

Figure 6:
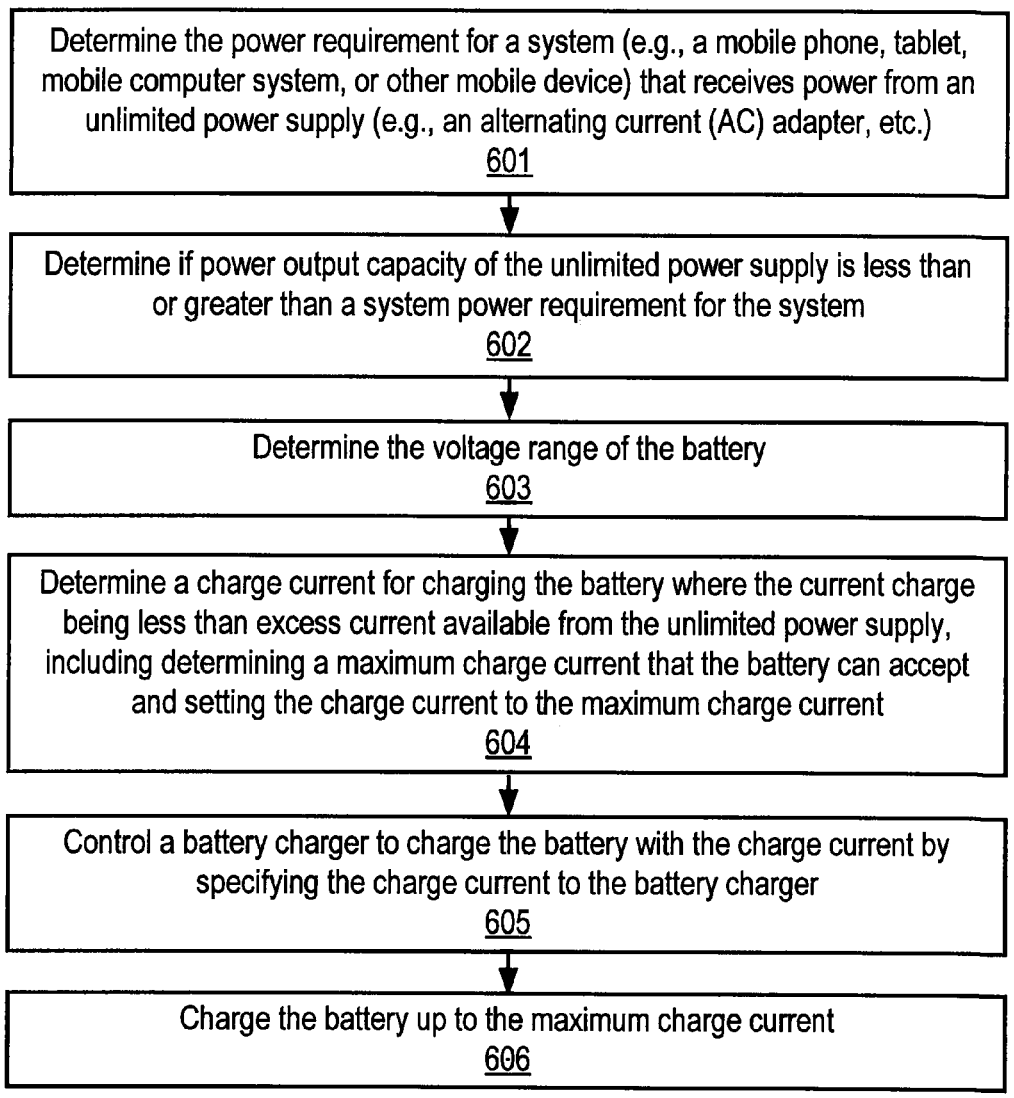
FIG. 6 is a flow diagram of another embodiment of a process for controlling the charging of a battery.

FIG. 6 is a flow diagram of another embodiment of a process for controlling the charging of a battery. The process is performed by processing logic that may comprise hardware (circuitry, dedicated logic, etc.), software (such as is run on a general purpose computer system or a dedicated machine), firmware, or a combination of these three.

Referring to FIG. 6, the process begins by processing logic determining the power requirement for a system (e.g., a mobile phone, tablet, mobile computer system, or other mobile device) that receives power from an unlimited power supply (e.g., an alternating current (AC) adapter, etc.) (processing block 601). In one embodiment, this is performed by the system itself and the results of the determination are sent to a battery charging controller. In another embodiment, the determination is made by performing in-line monitoring of the power being received by the system from the unlimited power supply.

Using the system power requirement, processing logic determines if power output capacity of the unlimited power supply is less than or greater than a system power requirement for the system (processing block 602).

Also, processing logic determines the voltage range of the battery (processing block 603). In one embodiment, determining the voltage range of the battery comprises estimating the open circuit voltage (OCV) of the battery.

If processing logic determining that the power output capacity of the unlimited power supply is less than the system power requirement, processing logic determines a charge current for charging the battery from the unlimited power supply, based on a voltage range of the battery, where the current charge being less than excess current available from the unlimited power supply (processing block 604). In other words, while the charge current for the battery could be set higher based on the available power from the unlimited power supply, the charge current is set lower. As discussed above, in one embodiment, this is done to extend the battery cycle life because reduced current mitigates battery degradation, as is well-known in the art.

In one embodiment, determining a charge current for charging the battery from the AC adapter comprises determining a maximum charge current that the battery can accept and setting the charge current to the maximum charge current. In one embodiment, determining the maximum charge current is based on one or more of temperature of the battery, voltage of the battery, age of the battery, battery impedance, and battery state of charge.

Once the charge current is set, processing logic controls a battery charger to charge the battery with the charge current by specifying the charge current to the battery charger (processing block 605).

In one embodiment, in response to the charge current being set, processing logic in the battery charger charges the battery up to the maximum charge current (processing block 606).

In a first example embodiment, a method comprises: determining if power output capacity of an alternating current (AC) adapter is less than or greater than a system power requirement for a system that receives power from the AC adapter and a battery; determining a charge current for charging the battery from the AC adapter, based on a voltage range of the battery, the current charge being less than excess current available from the AC adapter in view of determining that the power output capacity of the AC adapter is greater than the system power requirement; and controlling a battery charger to charge the battery with the charge current by specifying the charge current to the battery charger if the power output capacity of the AC adapter is greater than the system power requirement.

In another example embodiment, the subject matter of the first example embodiment can optionally include that determining the charge current for charging the battery is based on whether the battery is in a first voltage range or a second voltage range.

In another example embodiment, the subject matter of the first example embodiment can optionally include that the charge current is set to a first amount when the battery is in the first voltage range and adjusted to different predetermined amounts of current when battery when the battery is in the second voltage range.

In another example embodiment, the subject matter of the first example embodiment can optionally include that the different predetermined amounts of current are selected based on a stair stepped reduction in the charge current.

In another example embodiment, the subject matter of the first example embodiment can optionally include that the different predetermined amounts of current are selected based on a downward curved reduction in the charge current or a linear reduction in the charge current.

In another example embodiment, the subject matter of the first example embodiment can optionally include reducing, by the battery charger, current used for charging the battery to the charge current level.

In another example embodiment, the subject matter of the first example embodiment can optionally include determining the voltage range of the battery. In another example embodiment, the subject matter of this embodiment can optionally include that determining the voltage range comprises estimating the open circuit voltage (OCV) of the battery.

In another example embodiment, the subject matter of the first example embodiment can optionally include determining a charge current for charging the battery from the AC adapter comprises determining a maximum charge current that the battery can accept and setting the charge current to the maximum charge current. In another example embodiment, the subject matter of this embodiment can optionally include that determining the maximum charge current is based on one or more of temperature of the battery, voltage of the battery, age of the battery, battery impedance, and battery state of charge. In another example embodiment, the subject matter of this embodiment can optionally include the battery charger charging the battery up to the maximum charge current.

In a second example embodiment, an apparatus comprises: a first circuit to read voltage and current of a battery; and a controller coupled to the first circuit to determine a charge current for charging the battery from the AC adapter, based on a voltage range of the battery, wherein the controller determines the current charge to be less than excess current available from the AC adapter in response to a determination that the power output capacity of the AC adapter is greater than the system power requirement, and wherein the controller controls a battery charger to charge the battery with the charge current by specifying the charge current to the battery charger.

In another example embodiment, the subject matter of the second example embodiment can optionally include that the controller determines the charge current based on whether the voltage of the battery is in a first voltage range or a second voltage range.

In another example embodiment, the subject matter of the second example embodiment can optionally include that the controller sets the charge current to a first amount when the battery is in the first voltage range and adjusts the charge current to different predetermined amounts of current when the voltage of the battery is in the second voltage range.

In another example embodiment, the subject matter of the second example embodiment can optionally include that the different predetermined amounts of current are selected based on a stair stepped reduction in the charge current.

In another example embodiment, the subject matter of the second example embodiment can optionally include that the different predetermined amounts of current are selected based on a downward curved reduction in the charge current or downward linear reduction.

In another example embodiment, the subject matter of the second example embodiment can optionally include that the controller determines the voltage range by estimating open circuit voltage (OCV) of the battery.

In another example embodiment, the subject matter of the second example embodiment can optionally include that the controller determines the charge current for charging the battery by determining a maximum charge current that the battery can accept and setting the charge current to the maximum charge current.

In another example embodiment, the subject matter of the second example embodiment can optionally include that the controller determines the maximum charge current based on one or more of temperature of the battery, voltage of the battery, age of the battery, battery impedance, and battery state of charge.

In a third example embodiment, an apparatus comprises: a battery; a mobile device; an AC adapter coupled to the mobile device to supply power to the mobile device; a first circuit to read voltage and current of a battery; and a controller coupled to the first circuit to determine a charge current for charging the battery from the AC adapter, based on a voltage range of the battery, wherein the controller determines the current charge to be less than excess current available from the AC adapter in response to a determination that the power output capacity of the AC adapter is greater than the system power requirement, and wherein the controller controls a battery charger to charge the battery with the charge current by specifying the charge current to the battery charger.

In another example embodiment, the subject matter of the third example embodiment can optionally include that the controller sets the charge current to a first amount when the battery is in a first voltage range and adjusts the charge current to different predetermined amounts of current when the voltage of the battery is in a second voltage range.

In another example embodiment, the subject matter of the third example embodiment can optionally include that the controller determines the charge current for charging the battery by determining a maximum charge current that the battery can accept and setting the charge current to the maximum charge current.

In a fourth example embodiment, an article of manufacture has one or more non-transitory computer readable media storing instructions which, when executed by a controller, cause the controller to perform a method that comprises: determining if power output capacity of an alternating current (AC) adapter is less than or greater than a system power requirement for a system that receives power from the AC adapter and a battery; determining a charge current for charging the battery from the AC adapter, based on a voltage range of the battery, the current charge being less than excess current available from the AC adapter in view of determining that the power output capacity of the AC adapter is greater than the system power requirement; and controlling a battery charger to charge the battery with the charge current by specifying the charge current to the battery charger if the power output capacity of the AC adapter is greater than the system power requirement.

In another example embodiment, the subject matter of the fourth example embodiment can optionally include that determining a charge current for charging the battery comprises setting the charge current to a first amount when the battery is in a first voltage range and adjusts the charge current to different predetermined amounts of current when the voltage of the battery is in a second voltage range.

In another example embodiment, the subject matter of the fourth example embodiment can optionally include that determining a charge current for charging the battery comprises determining a maximum charge current that the battery can accept and setting the charge current to the maximum charge current.

Some portions of the detailed descriptions described herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   determining if power output capacity of an alternating current (AC) adapter is less than or greater than a system power requirement for a system that receives power from the AC adapter and a battery;
   determining a first charge current for charging the battery from the AC adapter, based on a first lower voltage range of the battery, the first charge current being less than excess current available from the AC adapter;
   determining a second charge current for charging the battery from the AC adapter, based on a second higher voltage range of the battery, the second charge current being less than the first charge current to extend a battery cycle life in an extend cycle life mode when battery capacity of the battery exceeds a predetermined percentage; and
   controlling a battery charger to charge the battery with the second charge current in the extend cycle life mode by specifying the second charge current to the battery charger if the power output capacity of the AC adapter is greater than the system power requirement.

2. The method defined in claim 1 wherein mode selection logic triggers entry into the extend cycle life mode based on a specific charge cycle number of the battery.

3. The method defined in claim 2 wherein the first charge current is set to a first amount when the battery is in the first lower voltage range and adjusted to different predetermined amounts of current when the battery is in the second higher voltage range with the different predetermined amounts of current being less than available current for charging from the AC adapter.

4. The method defined in claim 3 wherein the different predetermined amounts of current are selected based on a stair stepped reduction in the charge current.

5. The method defined in claim 3 wherein the different predetermined amounts of current are selected based on a downward curved reduction in the charge current or a linear reduction in the charge current.

6. The method defined in claim 3 further comprising reducing, by the battery charger, current used for charging the battery to the charge current level.

7. The method defined in claim 1 further comprising determining the voltage range of the battery.

8. The method defined in claim 7 wherein determining the voltage range comprises estimating the open circuit voltage (OCV) of the battery.

9. The method defined in claim 1 wherein determining a first charge current for charging the battery from the AC adapter comprises determining a maximum charge current that the battery can accept and setting the first charge current to the maximum charge current.

10. The method defined in claim 9 wherein determining the maximum charge current is based on one or more of temperature of the battery, voltage of the battery, age of the battery, battery impedance, and battery state of charge.

11. The method defined in claim 9 further comprising the battery charger charging the battery up to the maximum charge current.

12. An apparatus comprising:
   a first circuit to read voltage and current of a battery; and
   a controller coupled to the first circuit to determine a first charge current for charging the battery from the AC adapter, based on a first lower voltage range of the battery, wherein the controller determines the first charge current to be less than excess current available from the AC adapter and determines a second charge current for charging the battery from the AC adapter, based on a second higher voltage range of the battery, the second charge current being less than the first charge current to extend a battery cycle life in an extend cycle life mode when battery capacity of the battery exceeds a predetermined percentage, and wherein the controller controls a battery charger to charge the battery with the second charge current in the extend cycle life mode by specifying the second charge current to the battery charger.

13. The apparatus defined in claim 12 wherein the controller triggers entry into the extend cycle life mode based on a specific charge cycle number of the battery.

14. The apparatus defined in claim 13 wherein the controller sets the first charge current to a first amount when the battery is in the first lower voltage range and adjusts the first charge current to different predetermined amounts of current when the voltage of the battery is in the second higher voltage range.

15. The apparatus defined in claim 14 wherein the different predetermined amounts of current are selected based on a stair stepped reduction in the charge current.

16. The apparatus defined in claim 14 wherein the different predetermined amounts of current are selected based on a downward curved reduction in the charge current or downward linear reduction.

17. The apparatus defined in claim 12 wherein the controller determines the voltage range by estimating open circuit voltage (OCV) of the battery.

18. The apparatus defined in claim 12 wherein the controller determines the first charge current for charging the battery by determining a maximum charge current that the battery can accept and setting the first charge current to the maximum charge current.

19. The apparatus defined in claim 18 wherein the controller determines the maximum charge current based on one or more of temperature of the battery, voltage of the battery, age of the battery, battery impedance, and battery state of charge.

20. An apparatus comprising:
a battery;
a mobile device;
an AC adapter coupled to the mobile device to supply power to the mobile device;
a first circuit to read voltage and current of a battery; and
a controller coupled to the first circuit to determine a first charge current for charging the battery from the AC adapter, based on a first lower voltage range of the battery, wherein the controller determines the first charge current to be less than excess current available from the AC adapter and determines a second charge current for charging the battery from the AC adapter, based on a second higher voltage range of the battery, the second charge current being less than the first charge current to extend a battery cycle life in an extend cycle life mode when battery capacity of the battery exceeds a predetermined percentage, and wherein the controller controls a battery charger to charge the battery with the second charge current in the extend cycle life mode by specifying the second charge current to the battery charger.

21. The apparatus defined in claim 20 wherein the controller sets the first charge current to a first amount when the battery is in the first lower voltage range and adjusts the first charge current to different predetermined amounts of current when the voltage of the battery is in the second higher voltage range.

22. The apparatus defined in claim 20 wherein the controller determines the first charge current for charging the battery by determining a maximum charge current that the battery can accept and setting the first charge current to the maximum charge current.

23. An article of manufacture having one or more non-transitory computer readable media storing instructions which, when executed by a controller, cause the controller to perform a method comprising:
determining if power output capacity of an alternating current (AC) adapter is less than or greater than a system power requirement for a system that receives power from the AC adapter and a battery;
determining a first charge current for charging the battery from the AC adapter, based on a first lower voltage range of the battery, the first charge current being less than excess current available from the AC adapter;
determining a second charge current for charging the battery from the AC adapter, based on a second higher voltage range of the battery, the second charge current being less than the first charge current to extend a battery cycle life in an extend cycle life mode when battery capacity of the battery exceeds a predetermined percentage; and
controlling a battery charger to charge the battery with the second charge current in the extend cycle life mode by specifying the second charge current to the battery charger if the power output capacity of the AC adapter is greater than the system power requirement.

24. The article of manufacture defined in claim 23 wherein determining the first charge current for charging the battery comprises setting the first charge current to a first amount when the battery is in the first lower voltage range and adjusts the first charge current to different predetermined amounts of current when the voltage of the battery is in the second higher voltage range.

25. The article of manufacture defined in claim 23 wherein determining the first charge current for charging the battery comprises determining a maximum charge current that the battery can accept and setting the first charge current to the maximum charge current.

* * * * *